(12) United States Patent
Toyoshima

(10) Patent No.: US 6,485,538 B1
(45) Date of Patent: Nov. 26, 2002

(54) AIR-CONDITIONING AIR FILTER

(75) Inventor: Kenji Toyoshima, Sakai (JP)

(73) Assignee: Yugen Caisha Infinity Kenkyusho, Osaka (JP)

( * ) Notice: Subject to any disclaimer, the term of this patent is extended or adjusted under 35 U.S.C. 154(b) by 0 days.

(21) Appl. No.: 09/674,517

(22) PCT Filed: Mar. 17, 1999

(86) PCT No.: PCT/JP99/01712

§ 371 (c)(1),
(2), (4) Date: Nov. 17, 2000

(87) PCT Pub. No.: WO00/59606

PCT Pub. Date: Oct. 12, 2000

(51) Int. Cl.[7] .............................................. B01D 46/52
(52) U.S. Cl. ............................ 55/490; 55/497; 55/502; 55/504; 55/506; 55/509; 55/511; 55/521; 55/DIG. 31; 55/482; 55/484
(58) Field of Search .................... 55/490, 497, 501, 55/502, 504, 506, 509, 511, 521, DIG. 31, 482, 484

(56) References Cited

U.S. PATENT DOCUMENTS

| | | | | |
|---|---|---|---|---|
| 3,354,622 A | * | 11/1967 | Murphy, Jr. | 55/521 |
| 3,354,623 A | * | 11/1967 | Keller | 55/521 |
| 5,223,011 A | * | 6/1993 | Hanni | 55/497 |
| 5,512,074 A | * | 4/1996 | Hanni et al. | 55/497 |
| 5,733,350 A | * | 3/1998 | Muller et al. | 55/DIG. 31 |

FOREIGN PATENT DOCUMENTS

| | | |
|---|---|---|
| JP | 6-78027 | 11/1994 |
| JP | 11-33331 | 2/1999 |

* cited by examiner

Primary Examiner—David A. Simmons
Assistant Examiner—Minh-Chau T. Pham
(74) Attorney, Agent, or Firm—Jones, Tullar & Cooper, P.C.

(57) ABSTRACT

The present invention provides an air-conditioning air filter capable of cleaning and replacing only a filter element thereof for resources saving, refuse reduction, and cost reduction, and also preventing air leakage due to expanded deformation of a main box. The air-conditioning air filter has a plurality of filter bodies stored zigzag and removably in a main box, slide grooves formed in the upper and lower end surfaces of the filter frame, right and left side guard rails, which cover both sides of the upper and lower surfaces of the filter frame, installed projectedly on the inner surfaces of a top plate and bottom plate of the main box, guide rails, which are fitted slidably in the sliding channels, installed projectedly between the right and left side guard rails, engaging projections installed projectedly on the inner side of the right and left side guard rails, and engaging channels, which are engaged slidably with the engaging projections, provided in both side surfaces of the filter frame at the upper and lower end parts.

2 Claims, 7 Drawing Sheets

AIR-CONDITIONING AIR FILTER

TECHNICAL FIELD

The present invention relates to an air filter which is to be used in an air conditioning apparatus or the like installed in a building or the like.

BACKGROUND ART

In an air-conditioning air filter of this type, conventionally, a main box in which an air inlet is opened in one side and an air outlet is opened in the opposite side is produced, and filter elements are arranged in a zigzag manner between the air inlet and the air outlet in the main box, and integrally bonded with an adhesive agent. Recently, instead of the configuration in which only filter elements are directly bonded in the main box, a configuration is employed in which a plurality of filter bodies in each of which the outer circumference of a filter element is surrounded by a filter frame are produced, and the plurality of filter bodies are arranged in a zigzag manner in the main box.

As for the former air-conditioning air filter in which the filter elements are integrally bonded to the main box in an inseparable manner, however, the air filter is thrown away after only one use. In other words, the air filter is of a disposal type. This results in an increase of garbage, and this is extremely uneconomical.

As in the latter air filter, when filter bodies in each of which the outer circumference is surrounded by the filter frame are produced and the filter bodies are accommodated and disposed in the main box in a detachable manner, the main box and the filter bodies can be separated from one other. Therefore, washing or replacement of only the filter body can be performed, so as to realize a saving in resources and a decrease in garbage.

In this case, however, the main box is configured by a plastic molded product, and often molded so as to be relatively thin for the purposes of reducing the weight and the materials. In this case, when the main box receives a positive pressure or a negative pressure due to the air flowing in the main box, the main box is easily flexurally deformed. In the case where filter bodies are extractably accommodated in such a plastic main box in a sliding manner, a gap is produced between slide faces formed by inner faces of a top plate and a bottom plate of the main box and upper and lower end portions of the filter bodies, in conjunction with the flexural deformation in which the main box is swelled outward due to the positive pressure. This produces a problem in that the air may leak out through the portion without being filtered.

It is an object of the invention to provide an air-conditioning air filter in which cleaning or washing, or replacement of only a filter body configured by a filter element and a filter frame can be performed, so as to realize the saving in resources, the reduction in garbage, and the reduction in cost. It is an another object of the invention to provide an air-conditioning air filter in which air leakage between slide faces formed by inner faces of a main box and upper and lower end portions of filter bodies can be prevented from occurring.

SUMMARY OF THE INVENTION

The air-conditioning air filter of the present invention comprises: a main box made of plastics and having a shape in which an air inlet is opened in a front side and an air outlet is opened in a back side, an upper side is closed by a top plate, a bottom side is closed by a bottom plate, and right and left sides are closed by right and left side plates, respectively; and a plurality of filter bodies which are extractably accommodated in a zigzag manner between the air inlet and the air outlet in the main box, and each of the filter bodies is formed by fitting a bellow-like filter element into a rectangular filter frame. In such an air-conditioning air filter, sliding channels are formed in upper end faces and lower end faces of the filter frames, respectively, over a whole length in anteroposterior direction, and right and left guard rails having a shape which covers both sides of the upper end faces and the lower end faces of the filter frames, and guide rails which are placed in parallel with and between the right and left guard rails and to be slidably fitted with the sliding channels are protrudingly formed in a zigzag manner on inner faces of the top plate and the bottom plate of the main box, respectively. Engaging projections are protrudingly and horizontally disposed on inner sides of the right and left guard rails, and engaging channels which are to be slidably engaged with the engaging projections are disposed over a whole length in anteroposterior direction on both side faces of the upper end portion and the lower end portion of the filter frame in each of the filter bodies.

According to the thus configured air-conditioning air filter, since the filter bodies are extractably accommodated in the main box, the filter bodies can be taken out of the main box, and can be easily cleaned or washed, or replaced, so that the filter bodies can be reused. In addition, the filter bodies can slide by means of the upper and lower sliding channels along the guide rails between the upper and lower guard rails of the main box. Therefore, the filter bodies can be smoothly inserted into and extracted from the main box in anteroposterior direction without disengaging the sliding channels from the guide rails. In the filter bodies, the upper and lower engaging channels are slidably engaged with the engaging projections of the main box. Even in the case where the main box is flexurally deformed by a positive pressure to be swelled outward, the top plate and the bottom plate of the main box can be prevented from separating from the upper and lower end faces of the filter bodies, by the engagement function between the engaging projections and the engaging channels. Accordingly, it is possible to prevent a gap from being produced between the sliding faces of the upper and lower guide rails of the main box and the upper and lower sliding channels of the filter bodies, so that the air can be prevented from leaking out through the portion without being filtered.

The air-conditioning air filter of the invention comprises: a main box made of plastics and having a shape in which an air inlet is opened in a front side and an air outlet is opened in a back side, an upper side is closed by a top plate, a bottom side is closed by a bottom plate, and right and left sides are closed by right and left side plates, respectively; and a plurality of filter bodies which are extractably accommodated in a zigzag manner between the air inlet and the air outlet in the main box, and each of the filter bodies is formed by fitting a bellow-like filter element into a rectangular filter frame, wherein sliding channels having a T-shaped section are disposed on one of a pair of inner faces of the top plate and the bottom plate of the main box and a pair of an upper frame and a lower frame of each of the filter frames, and guide rails having a T-shaped section with which the sliding channels are to be fitted are disposed on the other pair.

According to the thus configured air-conditioning air filter also, since the filter bodies are extractably accommodated in the main box, the filter bodies can be taken out of the main box, and can be easily cleaned or washed, or replaced, so that the filter bodies can be used again. The filter bodies can be smoothly inserted into and extracted from the main box without derailing, by causing the upper and lower sliding channels having the T-shaped section to slide along the upper and lower guide rails having the T-shaped section. At the same time, even in the case where the main box is flexurally deformed by a positive pressure to be swelled outward, it is possible to prevent a gap from being produced between the sliding faces of the guide rails and the sliding channels, so that the air can be prevented from leaking out through the portion.

BEST MODE FOR CARRYING OUT THE INVENTION

Figure 1:
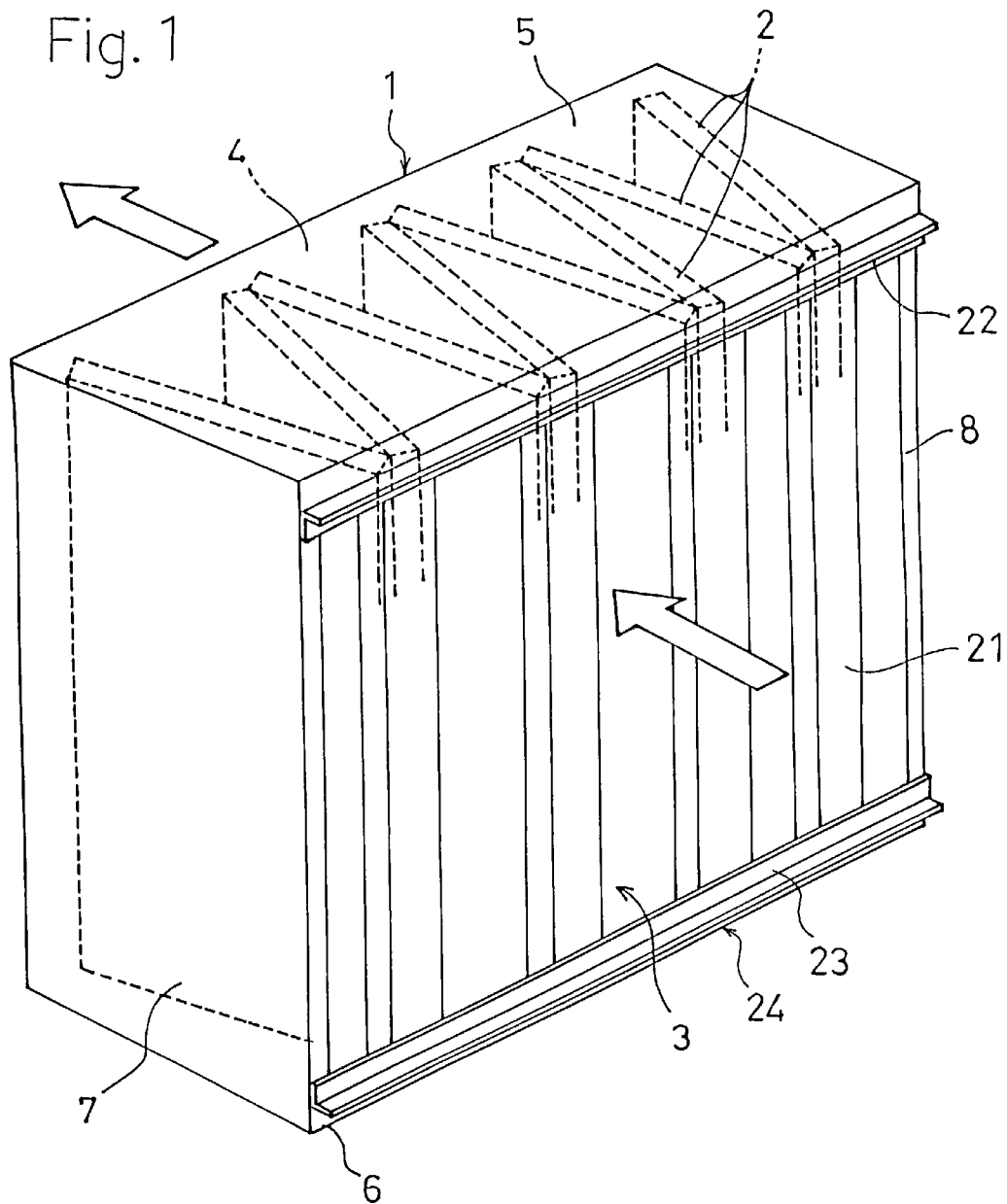
FIG. 1 is an external perspective view of an air-conditioning air filter.
Figure 2:
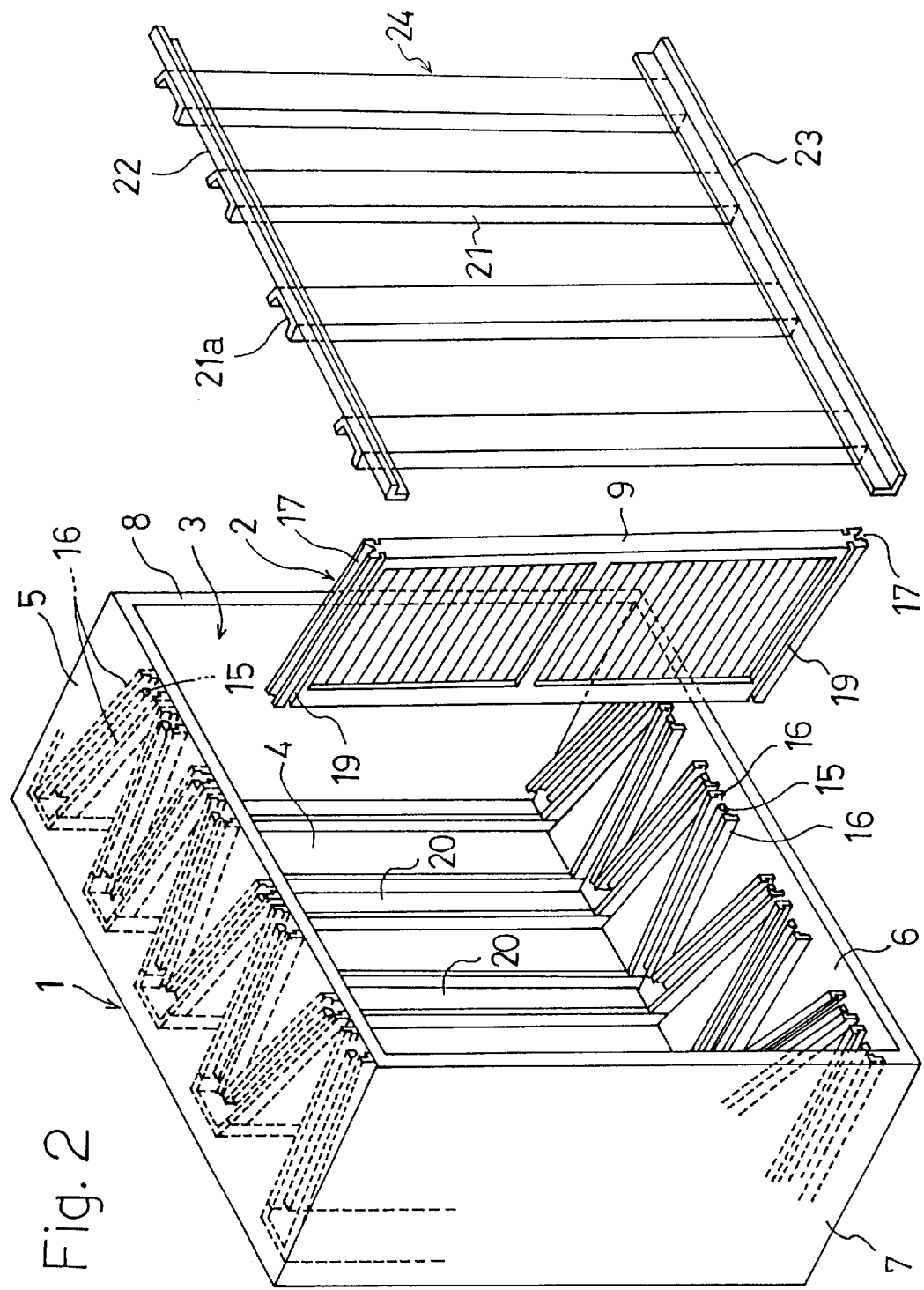
FIG. 2 is an exploded perspective view of the air-conditioning air filter.

Referring to FIGS. 1 and 2, the air-conditioning air filter comprises a main box 1, and a plurality of filter bodies 2 which are extractable accommodated in the main box 1. The main box 1 is a plastic molded product which is made of an ABS resin or the like, and in which an air inlet 3 is opened in the front side and an air outlet 4 is opened in the back side, the upper side is closed by a top plate 5, the bottom side is closed by a bottom plate 6, and the left and right sides are closed by left and right side plates 7 and 8, respectively.

Figure 3:
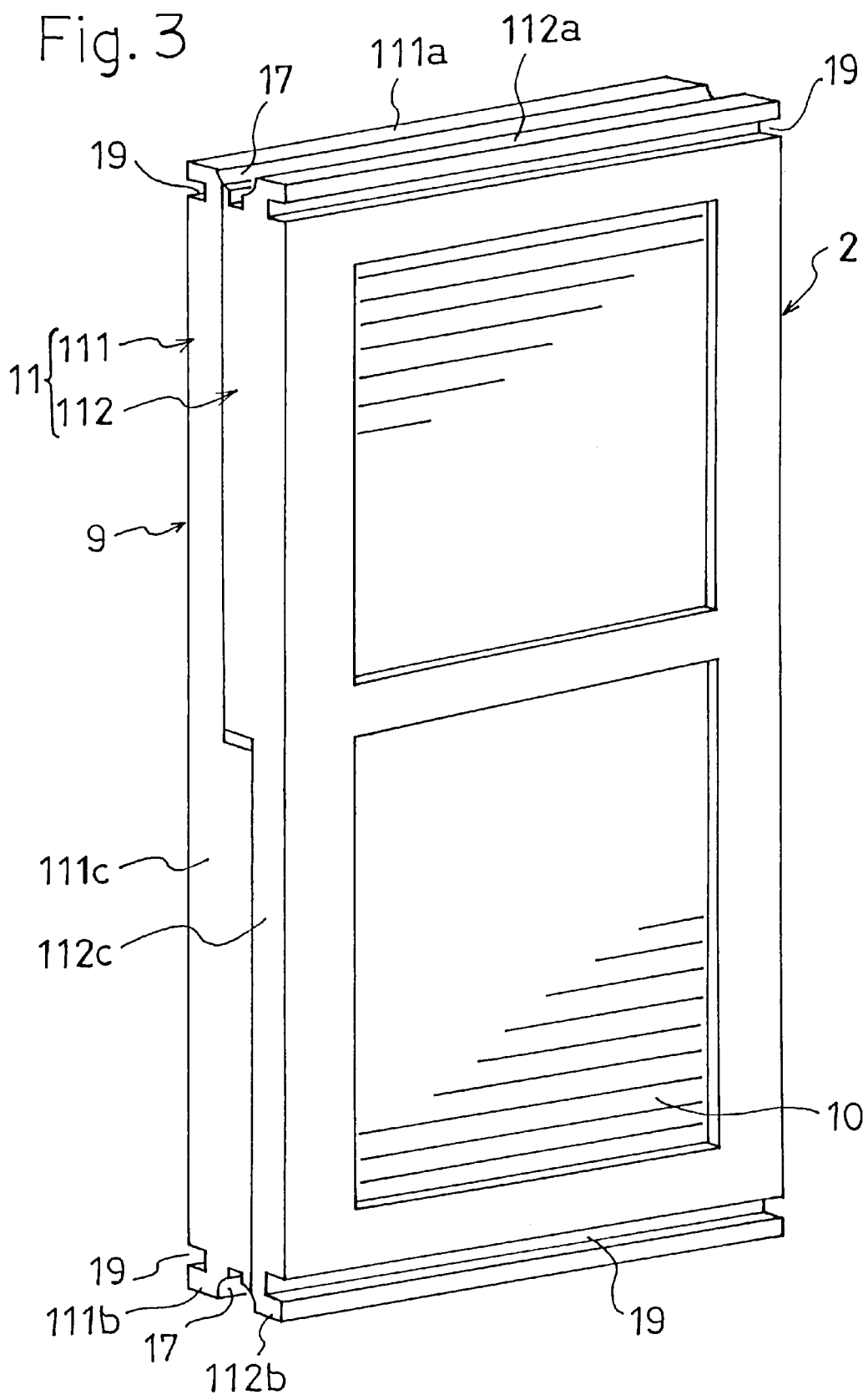
FIG. 3 is an external perspective view of a filter body of the air-conditioning air filter.
Figure 4:
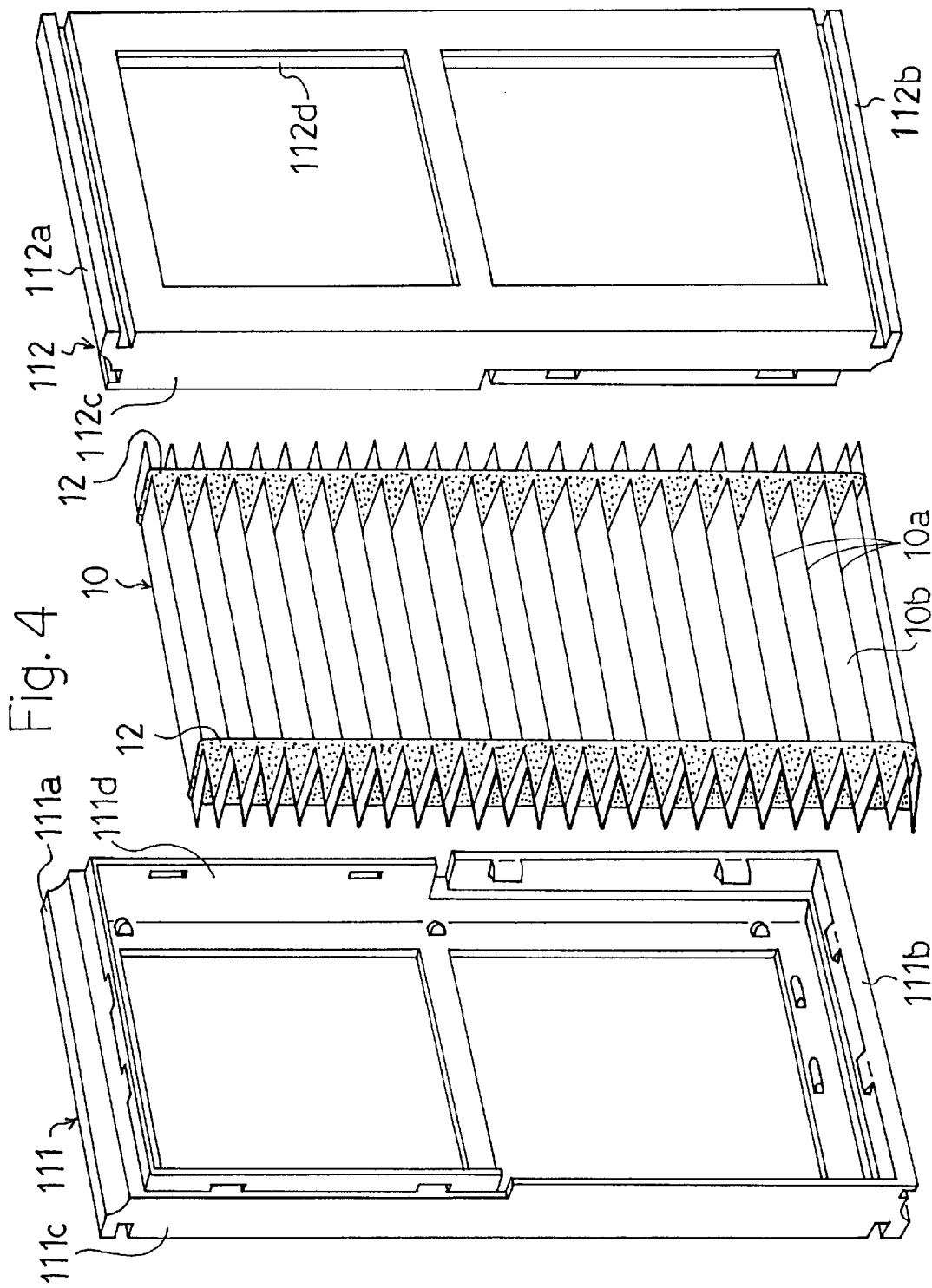
FIG. 4 is an exploded perspective view of the filter body of the air-conditioning air filter.

As shown in FIGS. 3 and 4, each of the filter bodies 2 is formed by fitting a filter element 10 into a rectangular frame-like filter frame 9. The filter frame 9 is formed by assembling channel-section frame members 11 made of plastics such as an ABS resin, into a rectangular shape. The channel-section frame member 11 is formed by butt-joining left and right split frames 111 and 112 in a separable manner. Each of the split frames 111 and 112 is formed so as to have a rectangular frame shape including upper and lower frames 111a or 112a, and 111b or 112b having an L-shaped section, and front and rear frames 111c or 112c, and 111d or 112d. The left and right split frames 111 and 112 are butt-joined, so that the upper and lower frames 111a, 112a, 111b, and 112b, and the front and rear frames 111c, 112c, 111d, and 112d exhibit channel section shapes.

As a material of each of the filter elements 10, synthetic fibers are used. Among synthetic fibers, used are polyolefine fibers such as polyethylene fibers and polypropylene fibers which can particularly resist against washing, and from which adherent dirt particles can be easily washed away. The polyolefine fibers are made into cloth such as nonwoven fabric, or knit fabric or woven fabric. As shown in FIG. 4, the cloth is folded so as to have a bellow-like shape in which a large number of mountain portions 10a successively range, thereby configuring the filter element 10.

On front and rear faces of both end portions in the width direction perpendicular to the mountain-portion ranging direction of the bellow-like filter element 10, a sealing member 12 made of a polypropylene resin is integrally formed in the mountain-portion ranging direction by applying the resin so as to fill valley portions 10b between adjacent mountain portions 10a and 10a, and then drying and hardening the resin.

Figure 5:
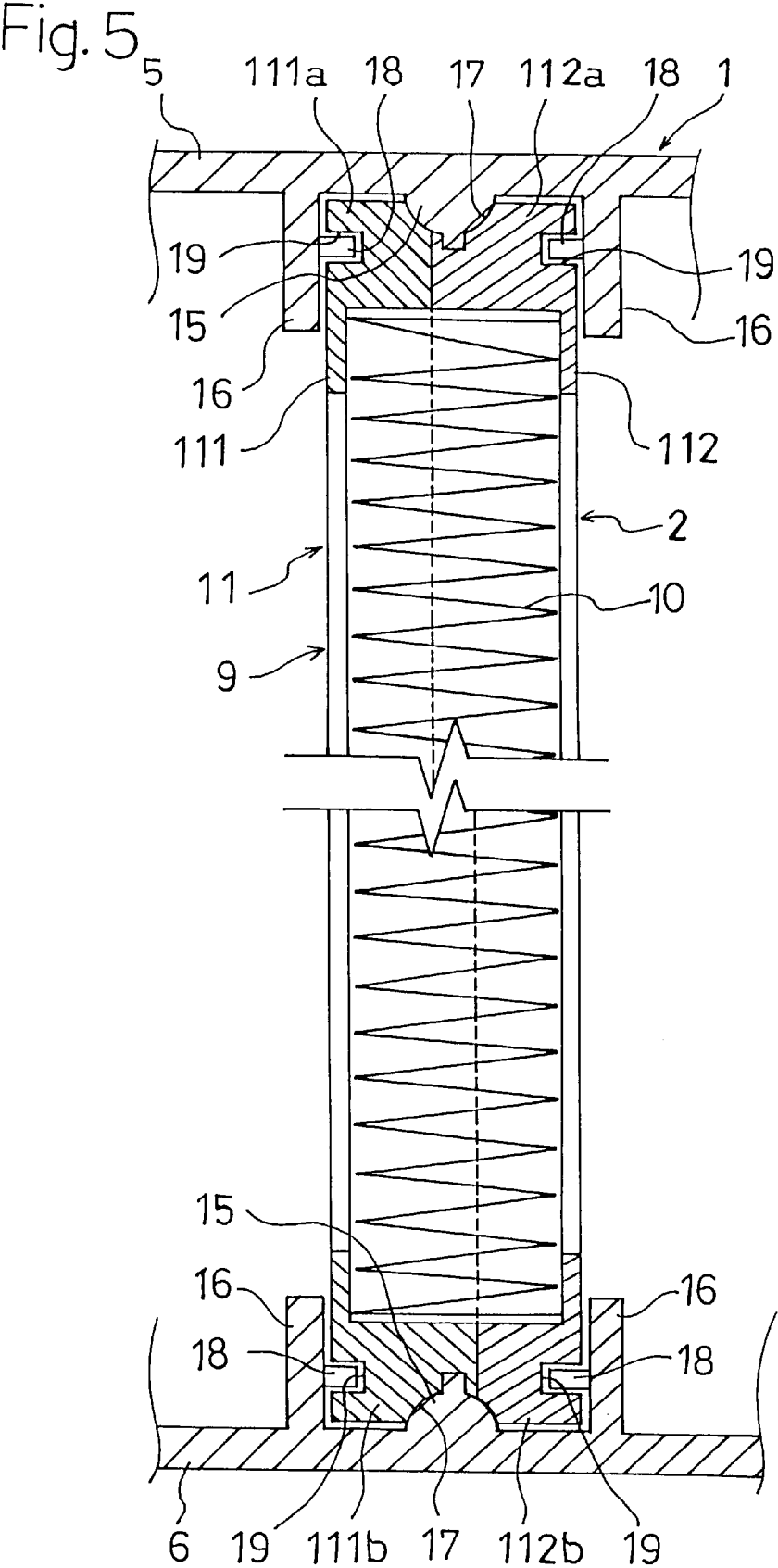
FIG. 5 is a vertical section view showing a sate where a filter body is accommodated in a main box of the air-conditioning air filter.
Figure 6:
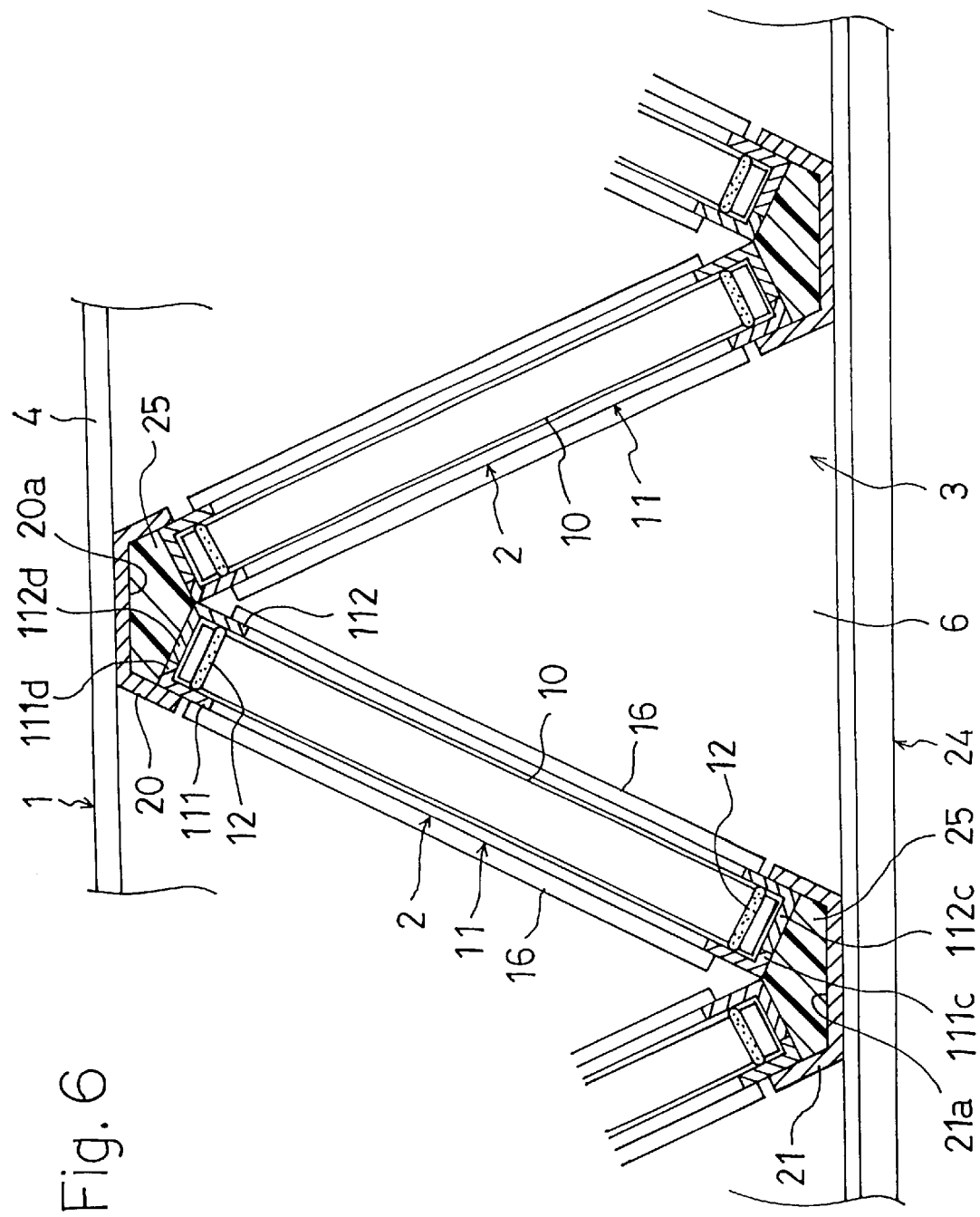
FIG. 6 is a transverse sectional plan view showing the sate where the filter bodies are accommodated in the main box of the air-conditioning air filter.

As shown in FIGS. 5 and 6, the filter element 10 is extractably clamped by the pair of the left and right split frames 111 and 112 of the channel-section frame member 11. At this time, both end portions in the width direction of the filter element 10 are fitted into the channel of the channel-section frame member 11, and gaps between the both end portions in the width direction and the inside of the channel of the channel-section frame member 11 are sealed by the sealing member 12. The sealing prevents the air from leaking through the gaps between the both end portions in the width direction of the filter element 10 and the channel of the channel member 11, without being filtered.

The filter element 10 is folded into a bellow-like shape, so that the area of the filter element 10 which has a predetermined length and width sizes and with which the air is in contact can be increased as much as possible. This produces an effect that the air-flow resistance is reduced.

As shown in FIGS. 1 and 6, the filter bodies 2 are attached into the main box 1 to be insertable and detachable through the front side of the main box 1, so as to be disposed in a zigzag manner in the lateral direction in the main box 1. The filter bodies 2 are disposed in the zigzag manner because the contact area of the air with respect to a predetermined number of filter bodies 2 is increased as much as possible, so as to reduce the air-flow resistance and enhance the filtering amount of the air.

As shown in FIGS. 2 and 5, on the inner face of the top plate 5 and that of the bottom plate 6 of the main box 1, a guide rail 15 having a convex section shape, and guard rails 16 and 16 respectively disposed in parallel on right and left sides of the guide rail 15 are protrudingly disposed in a zigzag manner. In each of upper end faces of the upper frames 111a and 112a and lower end faces of the lower frames 111b and 112b of the filter frame 9 of each of the filter bodies 2, a sliding channel 17 which has a convex section shape and is slidably fitted with the guide rail 15 is formed over a whole length in anteroposterior direction. The left and right guard rails 16 and 16 of the main box 1 are disposed oppositely with an interval which is slightly wider than the thickness of the filter frame 9 so as to cover both sides of the upper end portions of the upper frames 111a and 112a and the lower end portions of the lower frames 111b and 112b of the filter frame 9, respectively. Engaging projections 18 are horizontally and protrudingly disposed in front and rear of the inner sides of the left and right guard rails 16 and 16, respectively. Engaging channels 19 which are to be slidably engaged with the engaging projections 18 are disposed over a whole length in anteroposterior direction on both side faces of the upper frames 111a and 112a and on both side faces of the lower frames 111b and 112b of the filter frame 9, respectively.

In this configuration, the upper and lower frames 111a, 112a, 111b, and 112b of the filter body 2 are fitted between the guard rails 16 and 16 which are vertically opposed in the main box 1, and the upper and lower sliding channels 17 and 17 are caused to slide along the upper and lower guide rails 15 and 15, whereby the filter body 2 can be smoothly inserted into and extracted from the main box 1 in anteroposterior slanting direction without derailing. At the same time, the upper and lower engaging channels 19 of the filter body 2 are engaged with the engaging projections 18 of the main box 1. Even in the case where the top plate 5 and the bottom plate 6 of the main box 1 receive a positive pressure by the air flowing in the interior thereof to cause flexural deformation in which the plates are swelled outward, therefore, the upper and lower guide rails 15 and 15 of the main box 1 can be prevented from being displaced to separate from the upper and lower sliding channels 17 and 17 of the filter body 2. Accordingly, in this case, it is possible to avoid a condition where a gap is produced between the slide faces formed by the upper and lower guide rails 15 and 15 of the main box 1 and the upper and lower sliding channels 17 and 17 of the filter body 2 and the air leaks through the portion without being filtered.

As shown in FIGS. 2 and 6, in the air outlet 4 on the back side of the main box 1, rear vertical channel-section bridges 20 are fixedly disposed at predetermined pitches in the lateral direction correspondingly with the rear end positions of the guide rails 15. A channel 20a of each of the rear vertical bridges 20 receives the rear frames 111d and 112d of the filter body 2. In the air inlet 3 on the front side of the main box 1, a pressing frame member 24 formed by joining upper and lower lateral bridges 22 and 23 are fittably set so that front vertical channel-section bridges 21 are arranged at predetermined pitches in the lateral direction in positions correspondingly with the front end positions of the guide rails 15. After the filter bodies 2 are inserted into and accommodated in the main box 1, the pressing frame member 24 is fitted and fixed on the front side of the main box 1, so that the front frames 111c and 112c of each filter body 2 are pressed in a channel 21a of the corresponding front vertical bridge 21 and the whole of the filter body 2 is pressed against the rear vertical bridge 20.

As shown in FIG. 6, a sealing member 25 for preventing the air leakage and made of sponge rubber or the like is internally disposed in each of the channels 20a and 21a of the rear vertical bridge 20 and the front vertical bridge 21, so that the inflow air is prevented from leaking to the side of the air outlet 4 without being filtered, from the miter portion formed by the front frames 111c and 112c and the miter portion formed by the rear frames 111d and 112d of the adjacent filter bodies 2.

In the thus configured air-conditioning air filter, the air which flows into through the air inlet 3 is cleaned by the filtering function of the filter elements 10 of the filter bodies 2, and the air then flows out from the air outlet 4. At this time, as described above, even in the case where the top plate 5 and the bottom plate 6 of the main box 1 receive the positive pressure due to the air flowing in the interior thereof so as to cause flexural deformation in which the plates are swelled outward, the engagement function of the engaging projections 18 and the engaging channels 19 prevents a gap from being produced between slide faces formed by the guide rails 15 of the main box 1 and the sliding channels 17 of the filter bodies 2. Thus, the air cannot leak through the slide faces without being filtered. Accordingly, the air-conditioning air filter can enhance the efficiency of the air cleaning.

In the case where one of the filter bodies 2 is broken with the use, the main box 1 is continuously used as it is, and only the filter body 2 is taken out of the main box 1 and replaced with a new one. This replacement can be easily performed.

In the above-described embodiment, the filter element 10 can be taken out from the channels of the channel-section frame members 11 of the filter frame 9. When only the filter element 10 becomes dirty or broken, therefore, cleaning and washing or replacement thereof can be easily performed. After the filter element 10 is washed, it is again fitted into the filter frame 9 so as to be reused. The invention is not limited to this. Alternatively, the filter frame 9 and the filter element 10 may be integrally formed in an inseparable manner.

Figure 7:
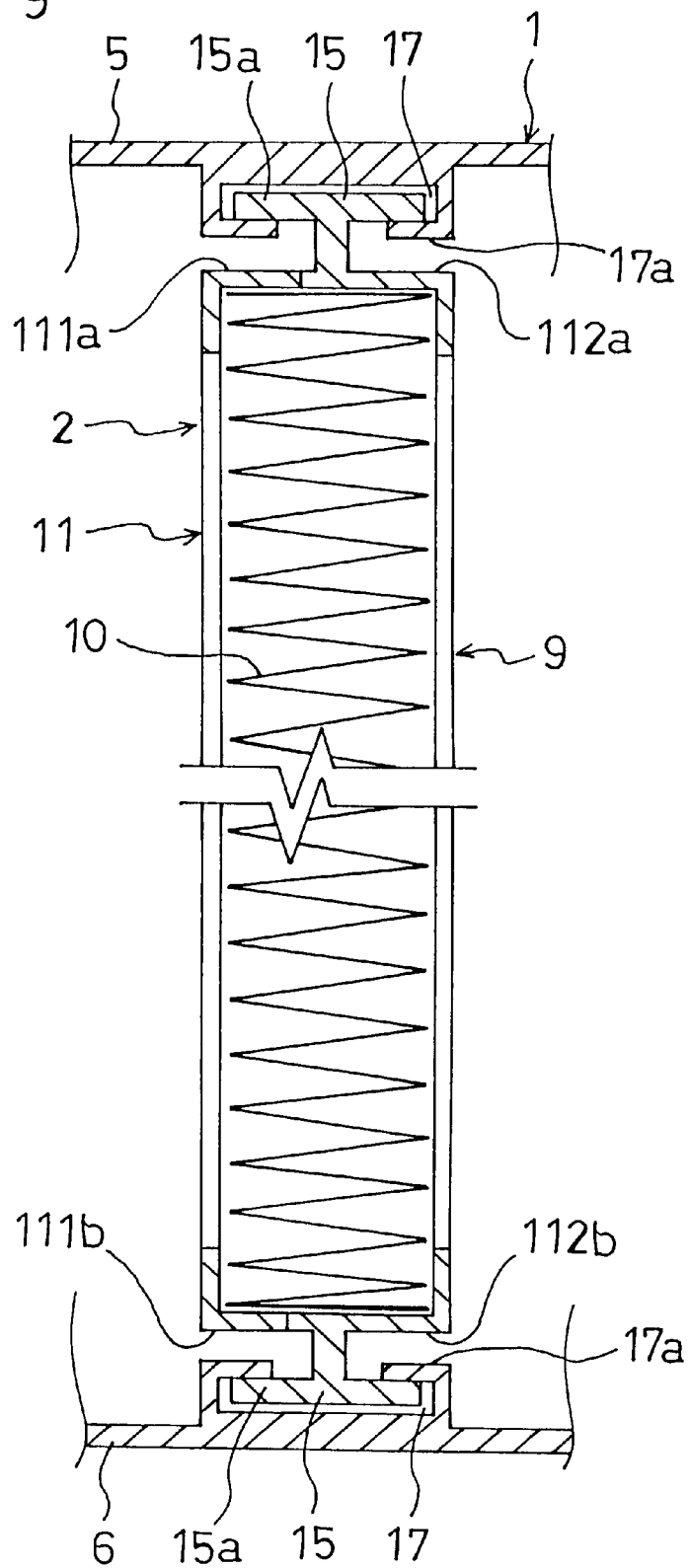
FIG. 7 is a vertical section view showing an embodiment showing another embodiment in a manner corresponding to FIG. 5.

Alternatively, as shown in FIG. 7, sliding channels 17 having a T-shaped section may be disposed on respective inner faces of the top plate 5 and the bottom plate 6 of the main box 1, and guide rails 15 having a T-shaped section with which the sliding channels 17 are to be engaged may be disposed on the upper frames 111a and 112a and the lower frames 111b and 112b of the filter frame 9, respectively. On the contrary, sliding channels 17 having a T-shaped section may be disposed on the upper frames 111a and 112a and the lower frames 111b and 112b of the filter frame 9, and guide rails 15 having a T-shaped section may be disposed on respective inner faces of the top plate 5 and the bottom plate 6 of the main box 1. Also in such configurations, even in the case where the top plate 5 and the bottom plate 6 of the main box 1 receive the positive pressure due to the air flowing in the interior thereof so as to cause flexural deformation in which the plates are swelled outward, the engagement function of a channel covering wall portion 17a for covering the sliding channel 17 having the T-shaped section and a horizontal wall portion 15a of the guide rail 15 can prevent a gap from being produced between the slide faces formed by the guide rail 15 of the main box 1 and the sliding channel 17 of the filter body 2. Thus, the air cannot leak through the slide faces without being filtered.

INDUSTRIAL APPLICABILITY

According to the invention, each of the filter bodies can be inserted into and extracted from the main box, so that cleaning and washing, or replacement of only the filter body can be performed, and the filter body then can be used again. Thus, the invention can contribute to the saving in resources and the reduction in garbage.

According to the present invention each of the filter bodies can be inserted into and extracted from the main box, so that cleaning and washing, or replacement of only the filter body can be performed, and the filter body then can be used again. Thus, the invention can contribute to the saving in resources and the reduction in garbage.

Each of the filter bodies can be smoothly inserted into and extracted from the main box without derailing, by causing the upper and lower sliding channels to slide along the guide rails between the upper and lower guard rails in the main box. At the same time, the upper and lower engaging channels of the filter body are slidably engaged with the engaging projections of the main box, so that, even in the case where the main box is flexurally deformed by a positive pressure to be swelled outward, it is possible to prevent a gap from being produced between the slide faces formed by the upper and lower guide rails of the main box and the upper and lower sliding channels of the filter body. Thus, it is possible to prevent the air from leaking from the portion.

Alternatively, each of the filter bodies can be smoothly inserted into and extracted from the main box without derailing, by causing the upper and lower sliding channels having the T-shaped section of the filter body to slide along the upper and lower guide rails having the T-shaped section. At the same time, even in the case where the main box is flexurally deformed by a positive pressure to be swelled outward, it is possible to prevent a gap from being produced between the slide faces formed by the guide rails and the sliding channels. Thus, it is possible to prevent the air from leaking from the portion.

What is claimed is:

1. An air-conditioning air filter comprising: a main box made of plastic and having a shape in which an air inlet is opened in a front side and an air outlet is opened in a back side, an upper side is closed by a top plate, a bottom side is closed by a bottom plate, and right and left sides are closed by right and left side plates, respectively; and a plurality of filter bodies which are extractably accommodated in a zigzag manner between said air inlet and said air outlet in said main box, each of said filter bodies being formed by fitting a filter element in the shape of a bellows into a rectangular filter frame, wherein sliding channels are formed in upper end faces and lower end faces of said filter frames, respectively, over a whole length in anteroposterior direction, right and left guard rails having a shape which covers both sides of said upper end faces and said lower end faces of said filter frames, and guide rails which being placed in parallel with and between said right and left guard rails and to be slidably fitted with said sliding channels are protrudingly formed in a zigzag manner on inner faces of said top plate and said bottom plate of said main box, respectively, engaging projections being protrudingly and horizontally disposed on inner sides of said right and left guard rails, and engaging channels which are to be slidably engaged with the engaging projections being formed over a whole length in anteroposterior direction on both side faces of said upper end portion and said lower end portion of each of said filter frames, wherein said guide rails are formed into a convex section shape, and said sliding channels are formed into a convex section shape corresponding to the convex section shape of said guide rails.

2. An air-conditioning air filter comprising: a main box made of plastic and having a shape in which an air inlet is opened in a front side and an air outlet is opened in a back side, an upper side is closed by a top plate, a bottom side is closed by a bottom plate, and right and left sides are closed by right and left side plates, respectively; and a plurality of filter bodies which are extractably accommodated in a zigzag manner between said air inlet and said air outlet in said main box, each of said filter bodies being formed by fitting a filter element in the shape of a bellows into a rectangular filter frame, wherein guide rails having a T-shaped section are disposed in a zigzag manner on one of a pair of upper and lower end faces of each of said filter frames and a pair of said top plate and said bottom plate of said main box, and sliding channels which are to be slidably fitted with said guide rails are disposed in a zigzag manner on the other pair.

* * * * *

UNITED STATES PATENT AND TRADEMARK OFFICE
CERTIFICATE OF CORRECTION

PATENT NO.    : 6,485,538 B1
DATED         : November 26, 2002
INVENTOR(S)   : Kenji Toyoshima It is certified that error appears in the above-identified patent and that said Letters Patent is hereby corrected as shown below:

<u>Title page,</u>
Item [22], the PCT filing date "Mar. 17, 1999" should be -- Mar. 31, 1999 --.

Signed and Sealed this

Twenty-eighth Day of October, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,485,538 B1
DATED         : November 26, 2002
INVENTOR(S)   : Toyoshima It is certified that error appears in the above-identified patent and that said Letters Patent is hereby corrected as shown below:

<u>Title page,</u>
Item [73], Assignee, should read:
-- Yugen Gaisha Infinity Kenkyusho --

Signed and Sealed this

Ninth Day of March, 2004

JON W. DUDAS
*Acting Director of the United States Patent and Trademark Office*